US012610029B2

(12) United States Patent
Chen et al.

(10) Patent No.: US 12,610,029 B2
(45) Date of Patent: Apr. 21, 2026

(54) EXTENDED REALITY PROJECTION SYSTEM, NOTEBOOK COMPUTER AND PROJECTION METHOD

(71) Applicant: Acer Incorporated, New Taipei City (TW)

(72) Inventors: Pin-Cheng Chen, New Taipei City (TW); Hsi Lin, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 0 days.

(21) Appl. No.: 18/769,629

(22) Filed: Jul. 11, 2024

(65) Prior Publication Data

US 2025/0142031 A1    May 1, 2025

(30) Foreign Application Priority Data

Oct. 25, 2023    (TW) ................................. 112140843

(51) Int. Cl.
*H04N 9/31*        (2006.01)
*G06V 10/60*       (2022.01)

(52) U.S. Cl.
CPC ........... *H04N 9/3173* (2013.01); *G06V 10/60* (2022.01)

(58) Field of Classification Search
CPC ................. H04N 9/3173; G06V 10/60; G02B 2027/014; G02B 2027/0187; G06F 3/011
See application file for complete search history.

(56) References Cited

U.S. PATENT DOCUMENTS

| | | | | |
|---|---|---|---|---|
| 5,742,263 | A * | 4/1998 | Wang .................... G06F 3/0321 |
| | | | | 345/9 |
| 9,342,610 | B2 | 5/2016 | Liu et al. |
| 9,555,320 | B2 | 1/2017 | Ellsworth |
| 9,626,764 | B2 | 4/2017 | Ellsworth et al. |
| 11,113,885 | B1 | 9/2021 | Cordes et al. |
| 11,297,285 | B2 | 4/2022 | Pierce |
| 11,327,310 | B1 | 5/2022 | Bates et al. |
| 2016/0239080 | A1* | 8/2016 | Marcolina ........... G06F 3/04815 |
| 2016/0364758 | A1* | 12/2016 | Achhra .............. G06Q 30/0601 |
| 2017/0262245 | A1* | 9/2017 | Yoganandan ............. G06T 7/90 |

(Continued)

FOREIGN PATENT DOCUMENTS

| | | |
|---|---|---|
| CN | 109814719 A | 5/2019 |
| CN | 114995642 A | 9/2022 |

(Continued)

*Primary Examiner* — Michael Lee

(74) *Attorney, Agent, or Firm* — Birch, Stewart, Kolasch & Birch, LLP

(57)        ABSTRACT

An extended reality (XR) projection system, a notebook computer and a projection method using the same are provided. The projection method includes the following steps. An image in front of a pair of XR glasses is captured by the pair of the XR glasses. The pair of the XR glasses searches the image in front of the pair of the XR glasses for an identification pattern on a curtain. The pair of the XR glasses transmits the identification pattern to a notebook computer. The notebook computer identifies an identification code of the curtain according to the identification pattern. The notebook computer transmits a frame corresponding to the identification code to the pair of the XR glasses. The pair of the XR glasses tracks the identification pattern to project the frame on the curtain.

19 Claims, 6 Drawing Sheets

(56)       References Cited

U.S. PATENT DOCUMENTS

| | | | |
|---|---|---|---|
| 2018/0349700 A1* | 12/2018 | Percuoco | G06Q 10/06 |
| 2019/0107411 A1* | 4/2019 | Gil | G01C 21/3632 |
| 2019/0121522 A1* | 4/2019 | Davis | G06V 40/28 |
| 2019/0206131 A1* | 7/2019 | Kamal | G06T 7/74 |
| 2020/0111232 A1* | 4/2020 | Bleyer | G06T 7/564 |

FOREIGN PATENT DOCUMENTS

| | | | |
|---|---|---|---|
| CN | 116643651 A | 8/2023 | |
| CN | 116866541 A | 10/2023 | |
| JP | 7007629 B2 | 1/2022 | |
| TW | I796039 B | 3/2023 | |

* cited by examiner

Notebook computer 200          Extended reality (XR) glasses 100

EXTENDED REALITY PROJECTION SYSTEM, NOTEBOOK COMPUTER AND PROJECTION METHOD

This application claims the benefit of Taiwan application Serial No. 112140843, filed Oct. 25, 2023, the disclosure of which is incorporated by reference herein in its entirety.

TECHNICAL FIELD

The disclosure relates in general to a projection system, an electronic device and a display method, and more particularly to an extended reality projection system, a notebook computer and a projection method.

BACKGROUND

The notebook computer has the advantages of being portable, powerful, and convenient for typing, and has become the main computer used by people. In order to be portable, the screen size of the notebook computer is usually less than 16 inches. Users often need to connect an external desktop screen to expand the display area.

However, people cannot take these desktop screens out with them, so the user experience is still limited.

SUMMARY

The disclosure is directed to an extended reality projection system, a notebook computer and a projection method, which utilizes a pair of an extended reality (XR) glasses to capture and track an identification pattern of a curtain to confirm which curtain being viewed by the user. The pair of the XR glasses could obtain the frame to be projected from the notebook computer and project it on the curtain for the user to view. Once used, the user could easily carry the curtain in various places to expand the display area of the notebook computer.

According to one embodiment, a projection method is provided. The projection method includes: capturing, by a pair of extended reality (XR) glasses, an image in front of the pair of the XR glasses; searching, by the pair of the XR glasses, the image in front of the pair of the XR glasses for an identification pattern on a curtain; transmitting, by the pair of the XR glasses, the identification pattern to a notebook computer; identifying, by the notebook computer, an identification code of the curtain according to the identification pattern; transmitting, by the notebook computer, a frame corresponding to the identification code to the XR glasses; and tracking, by the pair of the XR glasses, the identification pattern to project the frame on the curtain.

According to another embodiment, a notebook computer is provided. The notebook computer includes a communication unit, an identification unit and a pairing unit. The communication unit is configured to receive an identification pattern on a curtain. The identification pattern is searched from an image in front of a pair of extended reality (XR) glasses. The identification unit is configured to identify an identification code of the curtain according to the identification pattern. The pairing unit is configured to pair a frame and the identification code according to the identification code. The communication unit is further configured to transmit the frame to the pair of the XR glasses, and the pair of the XR glasses is configured to track the identification pattern, to project the frame on the curtain.

According to an alternative embodiment, an XR projection system is provided. The XR projection system includes a pair of XR glasses and a notebook computer. The pair of XR glasses includes an image capturing unit, a tracking unit, a transmission unit and a projection unit. The image capturing unit is configured to capture an image in front of the pair of the XR glasses. The tracking unit is configured to search the image in front of the pair of the XR glasses for an identification pattern on a curtain. The transmission unit is configured to transmit the identification pattern. The notebook computer includes a communication unit, an identification unit and a pairing unit. The communication unit is configured to receive the identification pattern. The identification unit is configured to identify an identification code of the curtain according to the identification pattern. The pairing unit is configured to pair a frame and the identification code according to the identification code. The communication unit of the notebook computer is further configured to transmit the frame to the transmission unit of the pair of the XR glasses, and the tracking unit of the pair of the XR glasses is further configured to track the identification pattern, to project the frame on the curtain.

Figure 1:
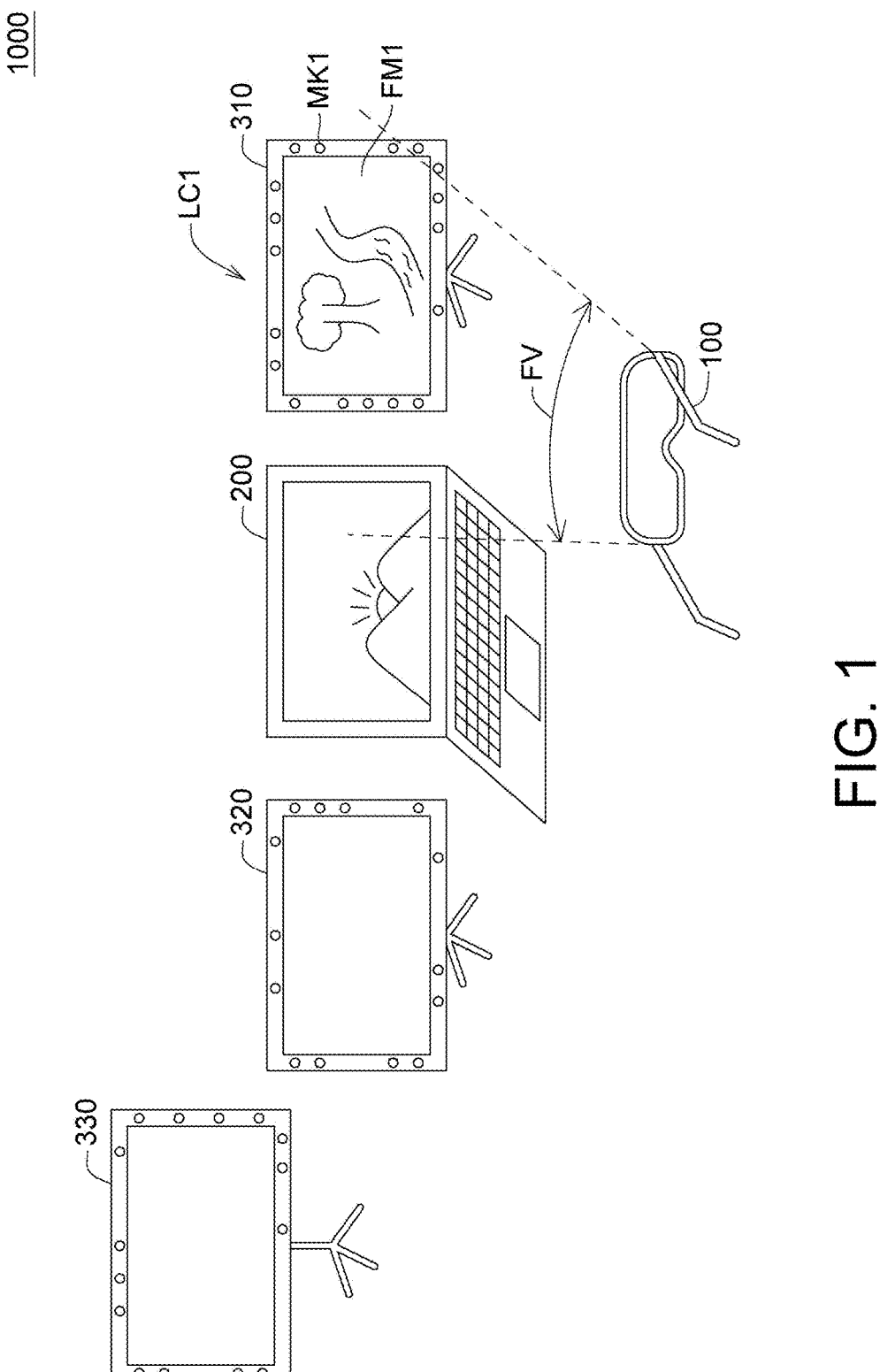
FIG. 1 illustrates a schematic diagram of an extended reality (XR) projection system according to one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical terms used in this specification refer to the idioms in this technical field. If there are explanations or definitions for some terms in this specification, the explanation or definition of this part of the terms shall prevail. Each embodiment of the present disclosure has one or more technical features. To the extent possible, a person with ordinary skill in the art may selectively implement some or all of the technical features in any embodiment, or selectively combine some or all of the technical features in these embodiments.

Please refer to FIG. 1, which illustrates a schematic diagram of an extended reality (XR) projection system 1000 according to one embodiment of the present disclosure. The XR projection system 1000 includes a pair of an XR glasses 100 and a notebook computer 200. In the present embodiment, in addition to the physical screen of the notebook computer 200, users can use a plurality of curtains 310, 320, and 330. These curtains 310, 320, and 330 could be placed arbitrarily. For example, the curtain 310 is placed at the right side of the notebook computer 200, the curtain 320 is placed at the left side of the notebook computer 200, and the curtain 330 is placed diagonally behind the notebook computer 200. When the user wears the pair of the XR glasses 100, he or she could view the physical screen of the notebook computer 200 or any of the curtains 310, 320, and 330. When the curtain 310 falls into the view angle FV of the pair of the XR glasses 100, the pair of the XR glasses 100 will capture at least one identification pattern MK1 on the curtain 310 to confirm that the user is currently viewing at the curtain 310. The pair of the XR glasses 100 projects the corresponding frame FM1 on the curtain 310 for the user to view. Through the technology of this embodiment, users can easily carry the curtains 310, 320, and 330 in various places to expand the display area of the notebook computer 200.

Figure 2:
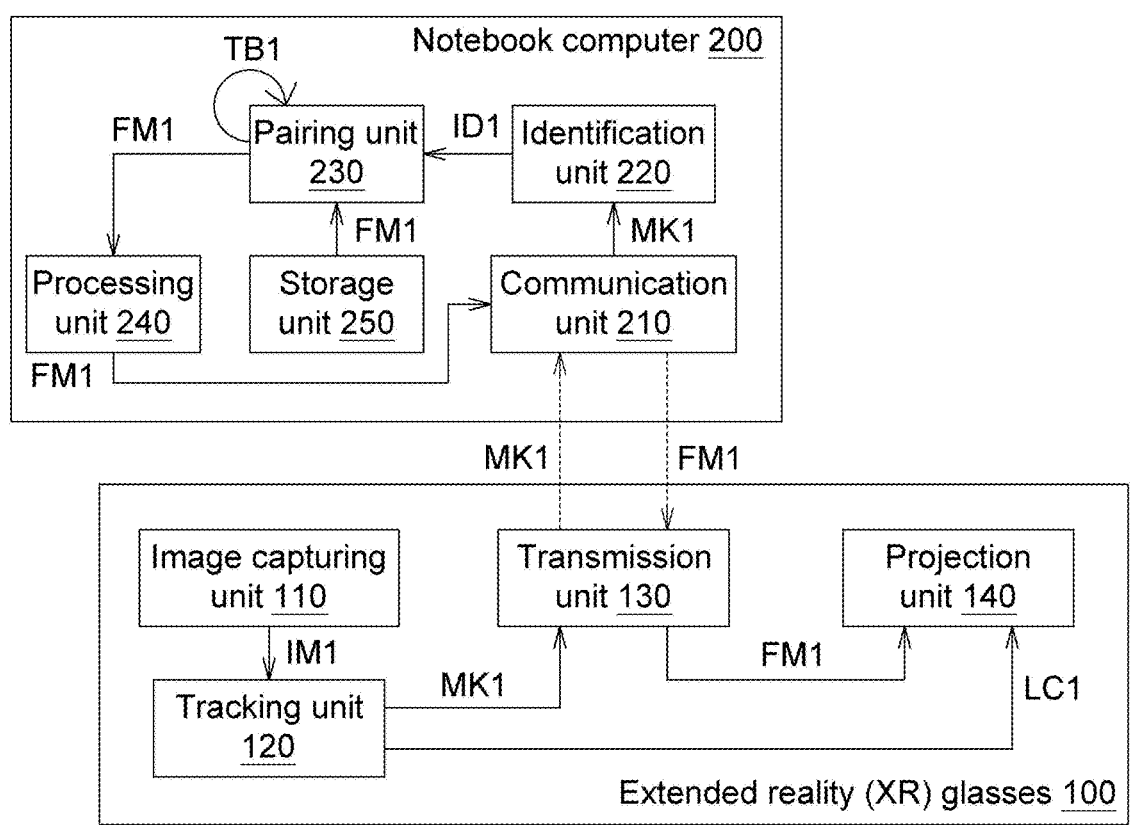
FIG. 2 illustrates a block diagram of the XR projection system according to one embodiment of the present disclosure.

Please refer to FIG. 2, which illustrates a block diagram of the XR projection system 1000 according to one embodiment of the present disclosure. In the XR projection system 1000, the pair of the XR glasses 100 includes an image capturing unit 110, a tracking unit 120, a transmission unit 130 and a projection unit 140. The image capturing unit 110 is used to capture still images or record dynamic images. The image capturing unit 110 is, for example, a camera, a lens or a Charge-coupled Device (CCD). The tracking unit 120 is used to identify and track a specific object or symbol. The tracking unit 120 is, for example, a circuit, a chip, a circuit board or a storage device that stores program code. The transmission unit 130 is used to transmit data. The transmission unit 130 is, for example, a wired transmission module, a wireless transmission module or a Bluetooth communication module. The projection unit 140 is used for projecting frame. The projection unit 140 is, for example, an LED micro-projector or a laser micro-projector.

The notebook computer 200 includes a communication unit 210, an identification unit 220, a pairing unit 230, a processing unit 240 and a storage unit 250. The communication unit 210 is used to transmit data. The communication unit 210 is, for example, a wired transmission module, a wireless transmission module or a Bluetooth communication module. The identification unit 220 is used to identify digital codes, and the pairing unit 230 is used to perform information pairing. The identification unit 220 and/or the pairing unit 230 is, for example, a circuit, a chip, a circuit board or a storage device that stores program code.

The processing unit 240 is used to execute various processing procedures and controlling procedures. The processing unit 240 is, for example, a circuit, a circuit board, a storage device storing program codes or a chip. The chip is, for example, a central processing unit (CPU), a programmable general-purpose or special-purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), an embedded system, a field programmable gate array (FPGA), other similar element or a combination thereof.

The storage unit 250 is used to store various data. The storage unit 250 is, for example, any type of fixed or removable random access memory (RAM), read-only memory (ROM), flash memory, hard disk drive (HDD), solid state drive (SSD) or similar components or a combination of the above components, used to store multiple modules or various applications that can be executed by the processing unit 240.

In this embodiment, the pair of the XR glasses 100 could capture and track an identification pattern MK1 on the curtain 310 through the image capturing unit 110 and the tracking unit 120 to confirm that the user is currently viewing at the curtain 310. After the pair of the XR glasses 100 communicates and processes with the notebook computer 200, the frame FM1 could be obtained from the notebook computer 200, and the projection unit 140 projects it on the curtain 310 for the user to watch. Through the technology of this embodiment, users could easily carry the above-mentioned curtains 310, 320, 330 in various places to expand the display area of the notebook computer 200. The following is a detailed description of the operation of the above components with a flow chart.

Figure 3:
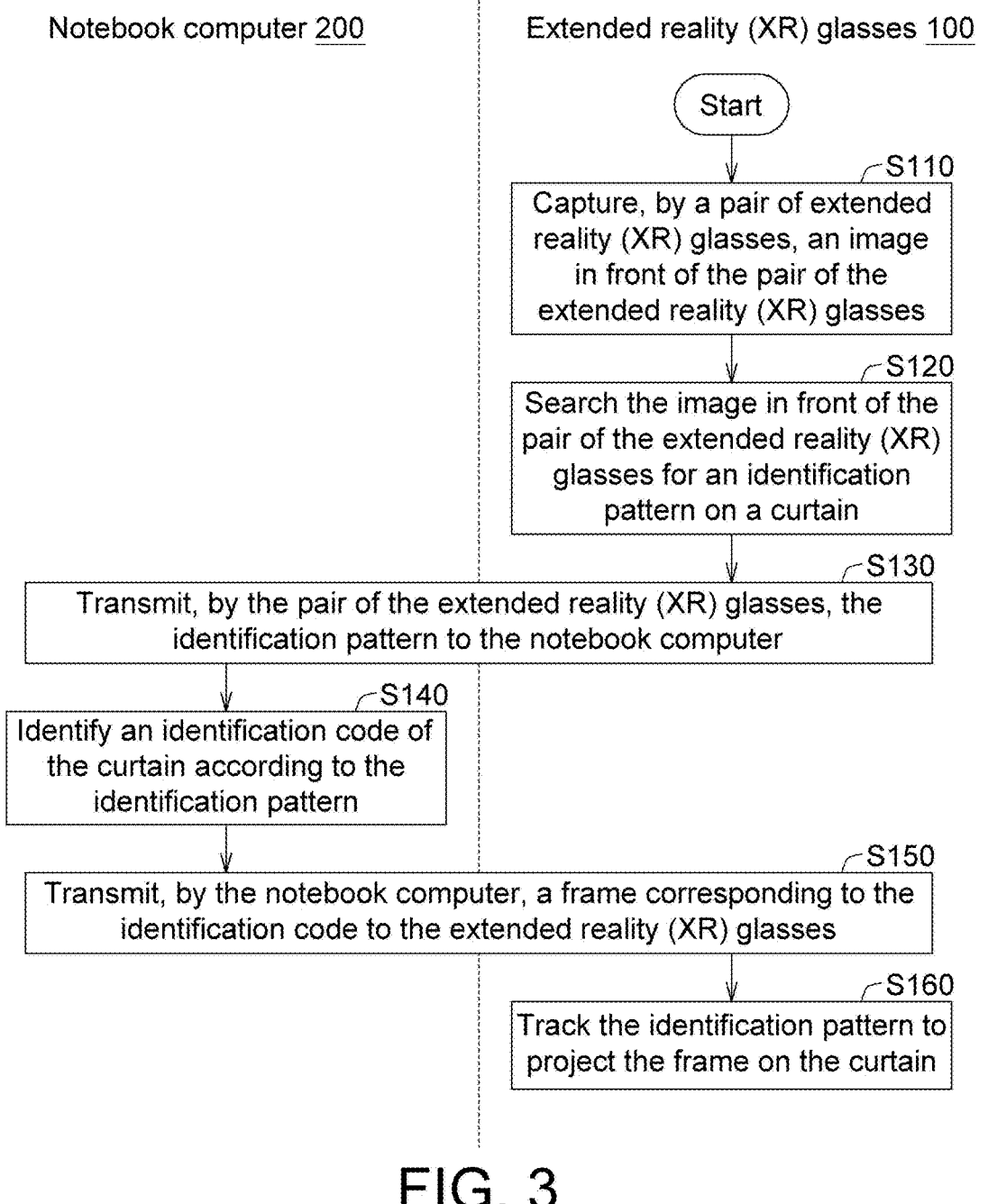
FIG. 3 illustrates a flow chart of a projection method according to an embodiment of the present disclosure.
Figure 4:
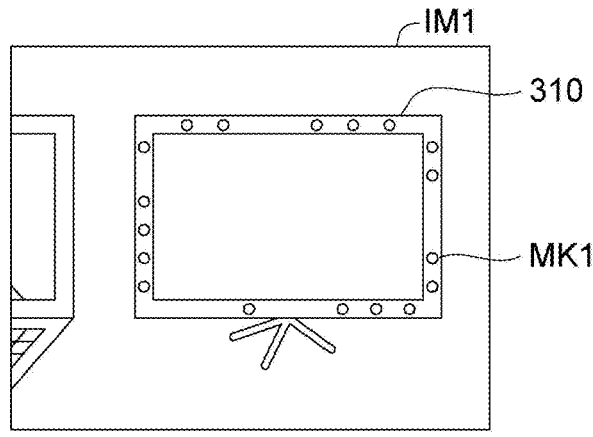
FIG. 4 illustrates an example image in front of the pair of the XR glasses.

Please refer to FIGS. 3 and 4. FIG. 3 illustrates a flow chart of a projection method according to an embodiment of the present disclosure. FIG. 4 illustrates an example image IM1 in front of the pair of the XR glasses 100. In step S110 of the FIG. 3, as shown in the FIG. 4, the image capturing unit 110 of the pair of the XR glasses 100 captures an image IM1 in front of the pair of the XR glasses 100. The view angle FV of the image capturing unit 110 (shown in FIG. 1) is, for example, 80 degrees, 90 degrees or 120 degrees. The view angle FV of the image capturing unit 110 mostly overlaps with the user's view angle, so the image IM1 in front of the pair of the XR glasses could be used to represent the image seen by the user. In one embodiment, the step S110 may be performed repeatedly, such that the image IM1 in front of the pair of the XR glasses could be continuously captured as the user's head rotates.

Figure 5:
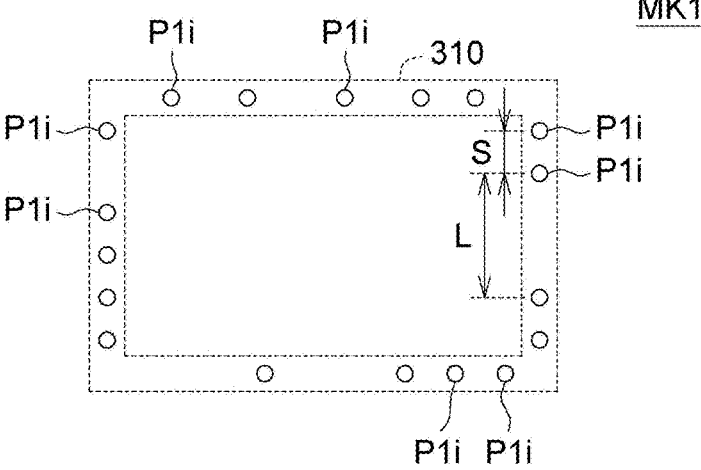
FIG. 5 illustrates the identification pattern.

Next, please refer to FIG. 5, which illustrates the identification pattern MK1. In step S120 of FIG. 3, as shown in FIG. 5, the tracking unit 120 of the pair of the XR glasses 100 searches the image IM1 in front of the pair of the XR glasses 100 for the identification pattern MK1 on the curtain 310. The identification pattern MK1 includes, for example, a plurality of white spots P1$i$. These white spots P1$i$ are disposed at four sides of the curtain 310. In one embodiment, the sizes of these white spots P1$i$ are substantially identical, and the colors are substantially identical. These white spot P1$i$ are fixed on the curtain 310 or fixed on a bracket of the curtain 310. In the different curtains 310, 320, 330 (as shown in FIG. 1), these white spots P1$i$ could be arranged in different ways to form different identification patterns. Taking FIG. 5 as an example, at the four sides of the curtain 310, the white spots P1$i$ could be arranged in different numbers and these white spots P1$i$ could be arranged at different intervals to form a unique identification pattern MK1.

Next, in step S130 of FIG. 3, as shown in FIG. 2, the pair of the XR glasses 100 transmits the identification pattern MK1 to the communication unit 210 of the notebook computer 200 through the transmission unit 130. The transmission unit 130 and the communication unit 210 are connected through a magnetic transmission line, Bluetooth communication or Wi-Fi communication, for example.

Then, in step S140 of FIG. 3, as shown in FIG. 2, the identification unit 220 of the notebook computer 200 identifies the identification code ID1 of the curtain 310 according to the identification pattern MK1. For example, as shown in FIG. 5, starting from the white spot P1$i$ at the upper right corner in a clockwise direction, the number of white spots P1$i$ at the four sides is 4, 4, 5, 5, so the corresponding identification code ID1 could be identified as [4, 4, 5, 5].

Or, as shown in FIG. 5, starting from the white spot P1$i$ at the upper right corner in a clockwise direction, the distances among the white spots P1$i$ are a small spacing S, a large spacing L, the small spacing S, the small spacing S, the small spacing S, the large spacing L, the small spacing S, the small spacing S, the small spacing S, the large spacing L, the small spacing S, the large spacing L, the small spacing S, the small spacing S, so the corresponding identification code ID1 can be identified as [S, L, S, S, S, L, S, S, S, L, S, L, S, S].

Next, in step S150 of FIG. 3, as shown in FIG. 2, the communication unit 210 of the notebook computer 200 transmits the frame FM1 corresponding to the identification code ID1 to the pair of the XR glasses 100. In this step, the identification unit 220 transmits the identification code ID1 to the pairing unit 230. The pairing unit 230 obtains the frame FM1 from the storage unit 250 according to a preset pairing table TB1, and transmits the frame FM1 to the processing unit 240 for processing. Then, the processed frame FM1 will be transmitted to the pair of the XR glasses 100 by the communication unit 210.

Next, in step S160 in FIG. 3, as shown in FIG. 2, the tracking unit 120 of the pair of XR glasses 100 tracks the identification pattern MK1 to project the frame FM1 on the curtain 310 through the projection unit 140. In this step, the tracking unit 120, for example, real-timely tracks the location LC1 where the identification pattern MK1 is located, and notifies the location LC1 to the projection unit 140, so that the projection unit 140 can correctly project the frame FM1 on the curtain 310.

In one embodiment, the frame FM1 is, for example, a stereoscopic frame. The frame FM1 can utilize left/right eye parallax to generate the stereoscopic vision. Although the frame FM1 is projected behind the curtain 310, people who are not wearing the pair of the XR glasses can also see the frame FM1, but only the location of the pair of the XR glasses 100 can form the correct left/Right eye parallax, so only the user wearing the pair of the XR glasses 100 can correctly experience the stereoscopic vision of the frame FM1.

Through the above projection method, the pair of the XR glasses 100 can confirm the curtain 310 that the user is currently viewing through the identification pattern MK1, and obtain the corresponding frame FM1 from the notebook computer 200 to project it on the curtain 310 for the user to view.

The quantity or spacings of the identification pattern MK1 in the above embodiment is used to identify the identification code ID1. In another embodiment, other ways could be used to identify the identification code. Please refer to the following description.

Figure 6:
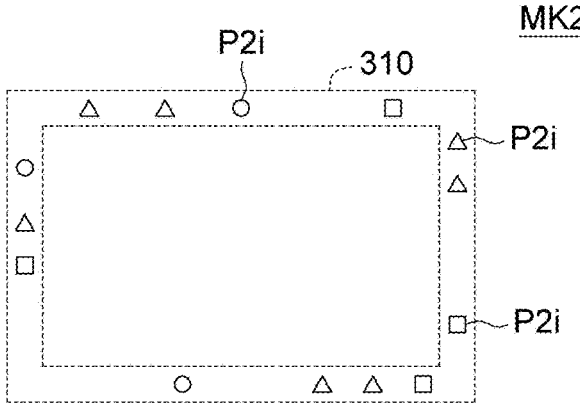
FIG. 6 illustrates another example of an identification pattern.

Please refer to FIG. 6, which illustrates another example of an identification pattern MK2. In this embodiment, a plurality of white spots P2$i$ with different shapes can be arranged at the four sides of the curtain 310 to form the identification pattern MK2. The shapes of these white spots P2$i$ are, for example, circles, rectangles, and triangles. For example, as shown in FIG. 6, starting from the white spot P2$i$ at the upper right corner in the clockwise direction, the shapes of the white spots P2$i$ at the four sides are a triangle, the triangle, a rectangle, the rectangle, the triangle, the triangle, a circle, the circle, the triangle, the circle, the triangle, the triangle, the circle, the rectangle. If the circle, the triangle, and the rectangle are defined as 0, 1, and 2 respectively, the identification unit 220 of the notebook computer 200 can identify the identification code as [1, 1, 2, 2, 1, 1, 0, 0, 1, 0, 1, 1, 0, 2].

Figure 7:
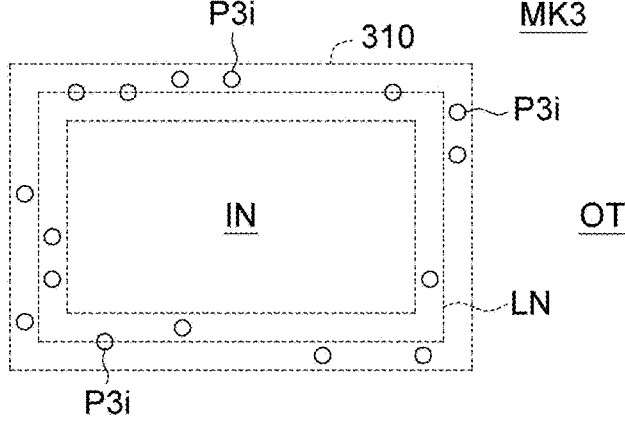
FIG. 7 illustrates another example of an identification pattern.

Please refer to FIG. 7, which illustrates another example of an identification pattern MK3. In this embodiment, a plurality of white spots P3$i$ are arranged along a predetermined straight line LN and have different offsets to form the identification pattern MK3. For example, as shown in FIG. 7, starting from the white spot P3$i$ at the upper right corner in a clockwise direction, the offsets of these white spots P3$i$ are at an outside area OT, the outside area OT, an inside area IN, the outside area OT, the outside area OT, the inside area IN, the predetermined straight line LN, the outside area OT, the inside area IN, the inside area IN, the outside area OT, the predetermined straight line LN, the predetermined straight line LN, the outside area OT, the outside area OT, the predetermined straight line LN. If the inside area IN, the predetermined straight line LN, and the outside area OT are defined as 0, 1, 2 respectively, the identification unit 220 of the notebook computer 200 can identify the identification code as [2, 2, 0, 2, 2, 0, 1, 2, 0, 0, 2, 1, 1, 2, 2, 1].

Figure 8:
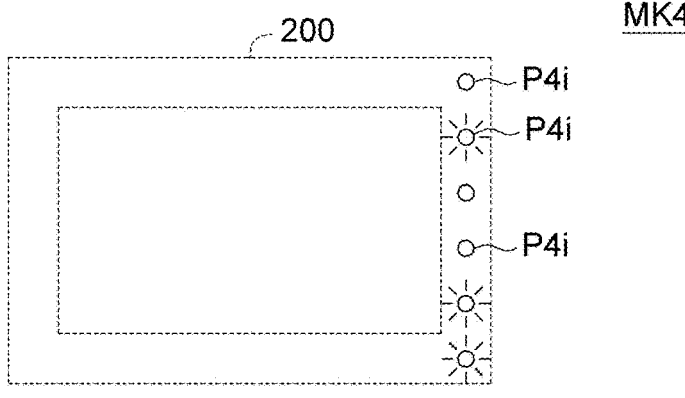
FIG. 8 illustrates another example of an identification pattern.

Please refer to FIG. 8, which illustrates another example of an identification pattern MK4. In the embodiment of FIG. 8, the identification pattern MK4 is composed of a plurality of light spots P4$i$ disposed on the physical screen of the notebook computer 200. Each of the light spots P4$i$ is, for example, an LED light or an infrared light. These light spots P4$i$ are, for example, disposed on the right border, the upper border and the left border of the physical screen of the notebook computer 200. In the image (not shown) in front of the pair of the XR glasses, usually only one of the right border, the top border and the left border of the physical screen will be captured. For example, as shown in FIG. 8, the captured light spots P4$i$ are arranged in a straight line. From top to bottom, the brightness of the light spots P1$i$ are "dark", "bright", "dark", "dark", "bright", "bright". If "dark" and "bright" are respectively defined as 0, 1. The identification unit 220 of the notebook computer 200 can identify the identification code as [0, 1, 0, 0, 1, 1].

The above examples illustrate various identification patterns MK1, MK2, MK3, MK4, but the present invention is not limited to the above examples. For example, the above-mentioned light spots can also form a dynamic identification pattern with different flashing frequencies, and the identification unit 220 of the notebook computer 200 can also identify the identification code based on the different flashing frequencies of these light spots.

Figure 9:
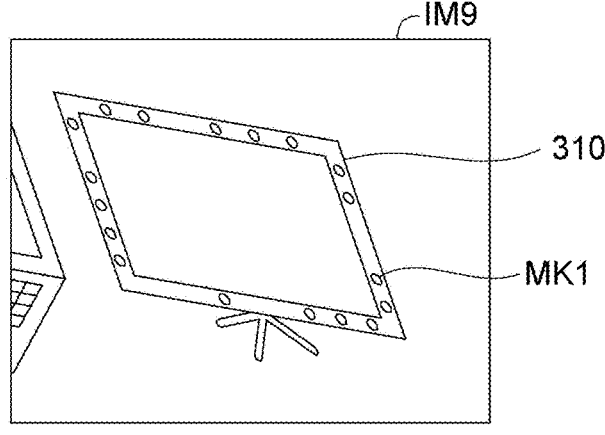
FIG. 9 illustrates another example of an image in front of the pair of the XR glasses.

In addition, please refer to FIG. 9, which illustrates another example of an image IM9 in front of the pair of the XR glasses. Since the pair of the XR glasses 100 is worn on the user's face, the user may not be facing the curtain 310 directly, causing the curtain 310 to deform.

Figure 10:
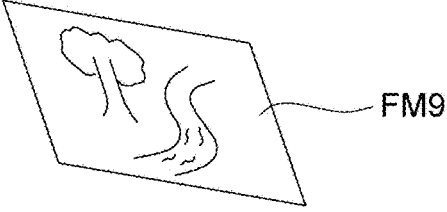
FIG. 10 shows an example of the adjustment of the frame.

Please refer to FIG. 10, which shows an example of the adjustment of the frame FM9. When the identification unit 220 of the notebook computer 200 detects the identification pattern MK1 and detects that the curtain 310 is deformed, it can notify the processing unit 240 of the notebook computer 200 and allow the processing unit 240 to adjust the frame FM9 according to the deformation.

According to the above embodiments, the pair of the XR glasses 100 can capture and track the identification patterns MK1, MK2, MK3, MK4 on the curtain 310 through the image capturing unit 110 and the tracking unit 120 to confirm that which one of the curtains 310, 320, 330 being viewed by the user. After the pair of the XR glasses 100 communicates and processes with the notebook computer 200, it can obtain the corresponding frames FM1, FM9 from the notebook computer 200, and use the projection unit 140 to project it on the curtains 310, 320, 330 for users to view. Through the technology of this embodiment, users can easily carry the above-mentioned curtains 310, 320, 330 in various places to expand the display area of the notebook computer 200.

The above disclosure provides various features for implementing some implementations or examples of the present disclosure. Specific examples of components and configurations (such as numerical values or names mentioned) are described above to simplify/illustrate some implementations of the present disclosure. Additionally, some embodiments of the present disclosure may repeat reference symbols and/or letters in various instances. This repetition is for simplicity and clarity and does not inherently indicate a relationship between the various embodiments and/or configurations discussed.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A projection method for a curtain, comprising:
capturing, by a pair of extended reality (XR) glasses, an image in front of the pair of the XR glasses;
searching, by the pair of the XR glasses, the image in front of the pair of the XR glasses for an identification pattern on the curtain;
transmitting, by the pair of the XR glasses, the identification pattern to a notebook computer;
identifying, by the notebook computer, an identification code of the curtain according to the identification pattern;
transmitting, by the notebook computer, a frame corresponding to the identification code to the XR glasses; and
tracking, by the pair of the XR glasses, the identification pattern to project the frame on the curtain;
wherein the notebook computer identifies a deformation of the curtain according to the identification pattern and adjusts the frame according to the deformation.

2. The projection method for the curtain according to claim 1, wherein the identification pattern includes a plurality of white spots.

3. The projection method for the curtain according to claim 2, wherein sizes of the white spots are substantially identical.

4. The projection method for the curtain according to claim 2, wherein the notebook computer identifies the identification code according to a quantity of the white spots at four sides of the curtain.

5. The projection method for the curtain according to claim 2, wherein the notebook computer identifies the identification code according to a plurality of distances among the white spots.

6. The projection method for the curtain according to claim 2, wherein the notebook computer identifies the identification code according to shapes of the white spots.

7. The projection method for the curtain according to claim 2, wherein the notebook computer identifies the identification code according to a plurality of offsets of the white spots along at least one predetermined straight line.

8. The projection method for the curtain according to claim 1, wherein the identification pattern includes a plurality of light spots.

9. The projection method for the curtain according to claim 8, wherein the light spots are disposed on a physical screen of the notebook computer.

10. The projection method for the curtain according to claim 8, wherein the notebook computer identifies the identification code according to brightnesses of the light spots.

11. The projection method for the curtain according to claim 8, wherein the notebook computer identifies the identification code according to flashing frequencies of the light spots.

12. The projection method for the curtain according to claim 1, wherein the frame is a stereoscopic frame.

13. A notebook computer, comprising:
a communication unit, configured to receive an identification pattern on a curtain, wherein the identification pattern is searched from an image in front of a pair of XR glasses;
an identification unit, configured to identify an identification code of the curtain according to the identification pattern; and
a pairing unit, configured to pair a frame and the identification code according to the identification code;
wherein the communication unit is further configured to transmit the frame to the pair of the XR glasses, and the pair of the XR glasses is configured to track the identification pattern, to project the frame on the curtain;
wherein the notebook computer identifies a deformation of the curtain according to the identification pattern and adjusts the frame according to the deformation.

14. The notebook computer according to claim 13, wherein the identification pattern includes a plurality of white spots.

15. The notebook computer according to claim 14, wherein sizes of the white spots are substantially identical.

16. The notebook computer according to claim 14, wherein the identification unit identifies the identification code according to a quantity of the white spots at four sides of the curtain.

17. The notebook computer according to claim 14, wherein the identification unit identifies the identification code according to a plurality of distances among the white spots.

18. The notebook computer according to claim 14, wherein the identification unit identifies the identification code according to shapes of the white spots.

19. An extended reality (XR) projection system, comprising:
a pair of XR glasses, including:
an image capturing unit, configured to capture an image in front of the pair of the XR glasses;
a tracking unit, configured to search the image in front of the pair of the XR glasses for an identification pattern on a curtain;
a transmission unit, configured to transmit the identification pattern; and
a projection unit; and
a notebook computer, including:
a communication unit, configured to receive the identification pattern;
an identification unit, configured to identify an identification code of the curtain according to the identification pattern; and
a pairing unit, configured to pair a frame and the identification code according to the identification code;

wherein the communication unit of the notebook computer is further configured to transmit the frame to the transmission unit of the pair of the XR glasses, and the tracking unit of the pair of the XR glasses is further configured to track the identification pattern, to project the frame on the curtain;

wherein the notebook computer identifies a deformation of the curtain according to the identification pattern and adjusts the frame according to the deformation.

* * * * *